United States Patent Office 3,078,611
Patented Feb. 26, 1963

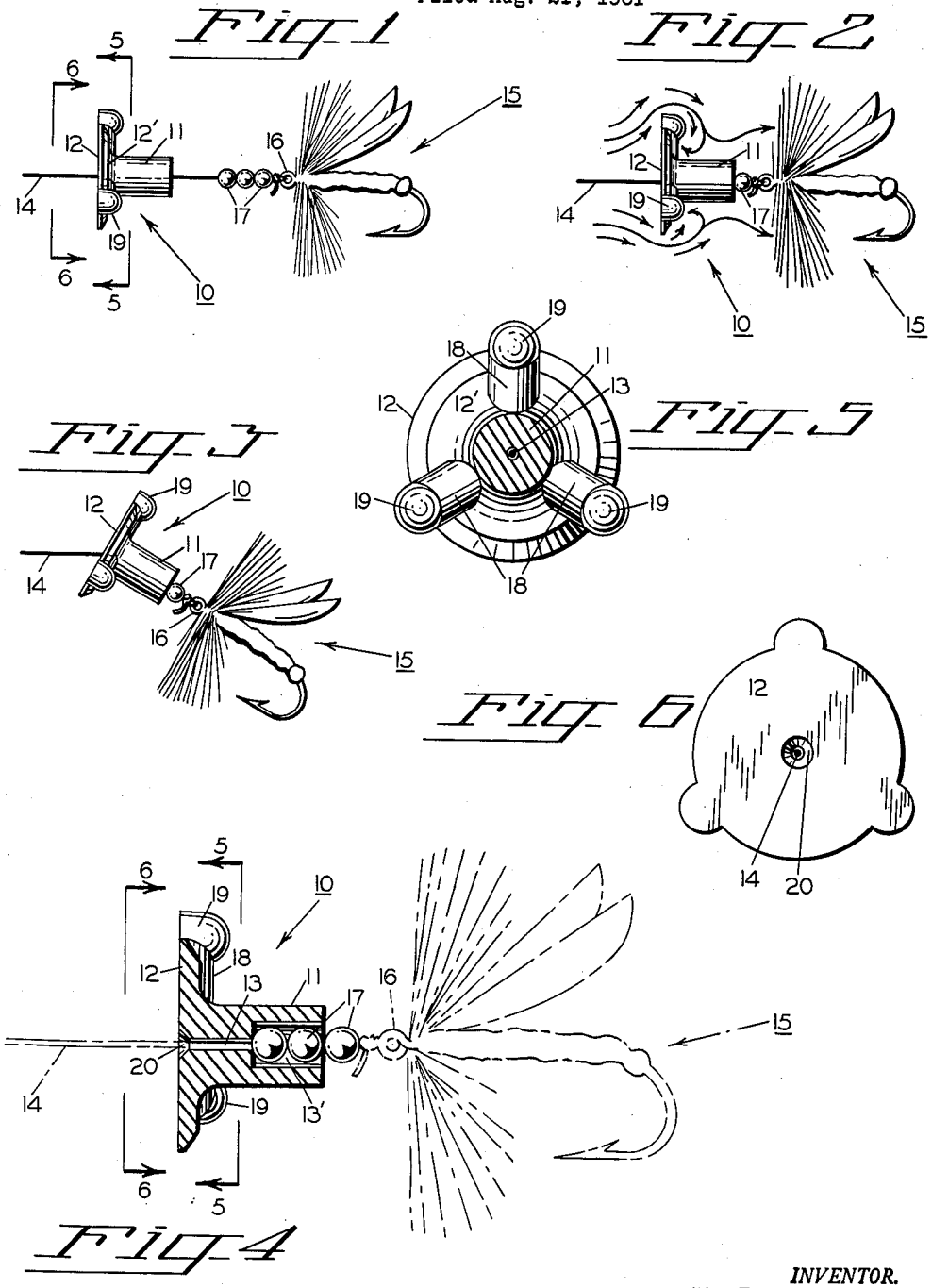

3,078,611
FISHING BAIT ACTIVATOR
Jim Z. Nishioka, 1268 Hemlock NW., Salem, Oreg.
Filed Aug. 21, 1961, Ser. No. 132,883
5 Claims. (Cl. 43—42.05)

This invention relates in general to means, such as lures, used on fishing lines, for attracting fish.

More specifically, the invention relates to means used in combination with the bait and hook on a fishing line for the purpose of agitating or activating the bait, particularly such artificial bait as fishing flies, in order not only to attract the attention of the fish but also to give the artificial bait a more live and realistic appearance and thus aid in enticing the fish to the bait and hook.

An object of the invention is to provide a simple and practical activator suitable for mounting on the fishing line immediately ahead of the bait and hook, which will produce a limited wobbling action in the bait and hook when the bait and hook are pulled through the water on the fishing line, or when the water in a flowing stream moves past the bait and hook.

A related object is to provide an activator for fishing bait which will produce a desirable wobbling action or activation of the bait without danger of overdoing the wobbling action and without the likelihood of frightening off the fish or of over-shadowing the bait itself.

A further object of the invention is to provide an improved fishing bait activator which can be slidably positioned on the fishing line immediately ahead of and adjacent to the bait and hook, but not directly attached thereto, so that the activator will easily slide back on the fishing line away from the bait and hook if a fish attempts to use the activator for leverage to get disengaged from the hook, and also so that it will not act as a handicap when it is necessary to play the fish on the hook in order to land the fish.

An additional object of the invention is to provide an activator of such simplified construction that it can be made very inexpensively from plastic, or other similarly suitable material, molded as a unit, in any desired color, and in any desired size.

Another object is to provide an improved fishing bait activator which can quickly and easily be installed on the fishing line and which, when installed, will not cause any appreciable wear on the line.

A still further object is to provide a fishing bait activator which will cause the fishing bait and hook to wobble or wiggle with the activator, but which will not necessarily cause the fishing bait and hook to rotate or the fishing line to twist, although the activator itself may be caused to rotate.

The form and construction of this fishing bait activator and the manner in which the activator attains these objects will be readily understood from the following description with reference to the accompanying drawings.

In the drawings:

FIGURE 1 is a side elevation showing the fishing bait activator mounted on the fishing line and approaching its operating position adjacent the bait and hook;

FIGURE 2 is a side elevation showing the activator, bait and hook in position, in illustrating the water turbulance set up by the activator;

FIGURE 3 is a similar side-elevation illustrating the wobbling action of the activator with which the bait and hook are caused to wobble with the activator;

FIGURE 4 is a sectional elevation of the activator, taken longitudinally along the axial channel in the activator, drawn to a larger scale, with the bait and hook indicated in broken lines;

FIGURE 5 is a transverse section taken on the lines indicated at 5—5 in FIGURES 1 and 4, and drawn to the same scale as FIGURE 4; and FIGURE 6 is an end elevation on the lines indicated at 6—6 in FIGURES 1 and 4, and drawn to the same scale as FIGURE 4.

The activator, indicated as a whole by the reference character on 10 comprises an integral molded body, of plastic or other similarly suitable light-weight material, having a stem portion 11 and an end disc-like portion 12. A central, axial channel 13 extends entirely through the body and is of sufficient diameter to accommodate the fishing line or leader 14 freely so as to enable the activator to slide freely on the line or leader 14 and also to be freely rotatable thereon.

The activator is placed on the line or leader 14 immediately ahead of the bait and hook, which are indicated in general by the reference character 15, but the activator is not otherwise attached to the bait and hook. The activator is mounted on the line 14 is the position shown in FIGURES 1 and 2, and thus with the disc-like portion 12 positioned at the end of the activator away from the bait and hook.

Preferably, although not necessarily, the end portion of the axial channel 13 on the opposite end from the disc portion 12 is enlarged in diameter so as to provide an inwardly-extending axial recess 13', as shown in FIGURE 4. This recess is large enough to accommodate the end loop or eye 16 of the bait and hook by which the line or leader 14 is attached to the bait and hook. Also preferably, but not necessarily, this end recess 13' is made deep enough to accommodate one or more small, loosely mounted beads 17 which may be placed on the line 14 ahead of the eye 16 of the bait and hook. Such preferred arrangement enables the beads 17 to act as bearings for the activator with respect to the eye 16 of the bait and hook, thus making it possible for the activator to rotate more easily without causing rotation of the bait and hook should the action of the water on the activator be such as to cause rotation of the activator from time to time.

Such arrangement, preferably with bearing beads on the line between the activator and the eye 16 of the hook, and with some or all of the bearing beads capable of being accommodated in the channel recess of the activator, keeps the activator positioned the desired and correct distance from the bait and hook when the activator is functioning. In this position the activator causes the bait and hook to move laterally in various directions with the activator as the activator is moved rapidly slightly back and forth laterally with respect to the relative direction of travel of the line 14 through the water. In other words, in this manner, the bait and hook wobble with the activator.

The disc-like end portion 13 of the activator has a substantially flat forward face or front side 12'. The rear side of this portion preferably has a plurality (for example, 3) of equally spaced radial ribs 18 which extend a short distance beyond the remainder of the periphery of the disc-like portion. Also preferably the outer end of each of these ribs 18 carries a small, semi-spherical or rounded lobe 19, which, when given a different contrasting color from that of the rest of the activator, aids in attracting the attention of the fish without being startling enough to frighten the fish. These ribs and lobes also increase the wobble of the activator at slow speeds, particularly when the activator is made in smaller sizes, and furthermore reduce the tendency of the activator to rotate on the fishing line.

The forward end of the axial channel 13 in the portion 12 is formed with a small outward bevel 20 so as to minimize any wearing of the line or leader 14 at this point, in view of the fact that this is the point at which the movement of the activator begins when in action.

The action which takes place as the activator is pulled through the water (or as the water moves past the activator in the case of a flowing stream) is illustrated in FIGS. 2 and 3. The engagement of the water by the front face of the disc-like portion 12 results in turbulance of the water behind this portion, as indicated by the arrows in FIG. 2. The effect of this turbulance on an artificial bait or "fly" hook is to produce a slight pulsating action with the "fly." Furthermore the engagement of the water with the front face and periphery of the portion 12 of the activator will cause the activator to swing slightly from side to side with respect to the direction of pull on the line 14, and thus a wobbling is set up by the activator which is imparted also to the bait and hook.

The effect of the combined pulsating and wobbling movement of the bait is to simulate, to considerable extent, the fluttering movements of a live fly, for example, in the water, thus rendering the artificial bait more effective. The fact that the wobbling begins only at the front of the activator, and thus only a slight distance from the bait and hook, is important, since the desirable effect of such wobbling would be lost entirely if the wobbling began at a much further distance ahead of the bait and hook.

The pressure of the water against the forward face of the activator keeps the activator in position immediately ahead of the bait and hook. However, when a fish is hooked, the activator will slide away from the bait and hook if the fish contacts the adjacent end of the activator. This prevents any possibility that the fish could use the activator for leverage or as other means for getting free from the hook, and the fact that the activator will slide forward easily on the leader or line prevents the activator from acting as a handicap in playing the fish in order to land it.

The activator can be made in a variety of sizes and colors, enabling the fisherman to make his own selection of color and size. However, best results have been obtained by having the color of the activator approximate that of a bait used and by having the size of the activator, with respect to the size of the bait hook, substantially as illustrated in the drawings.

I claim:

1. A fishing bait agitator adapted to be mounted ahead of and adjacent to a bait and hook on a fishing line, said agitator comprising an integral body having a front disc-like portion and a stem portion extending rearwardly from said front portion, said body having an axial channel extending through said body and allowing free passage of the fishing line through said channel and body, and radial ribs on the rear face of said front disc-like portion extending from said stem portion to the periphery of said disc-like portion and terminating a slight distance beyond said periphery, whereby, when said agitator is placed on a fishing line immediately ahead of the bait and hook, with said disc-like portion facing in the relative direction of the travel of the bait and hook with respect to the water, and with the end of said stem portion adjacent said bait and hook, said agitator will impart a pulsating and wobbling action to said bait.

2. A fishing bait agitator adapted to be mounted ahead of and adjacent to a bait and hook on a fishing line, said agitator comprising an integral body having a front disc-like portion and an axially aligned stem portion extending rearwardly from said front portion, said body having an axial channel extending through said body and allowing free passage of a fishing line through said channel and body, the diameter of said channel being increased in said stem portion to provide a recess in said body in the rearward end of said stem portion, a bearing bead loosely mounted on said line ahead of said bait and hook and freely accommodated in said recess, and radial ribs on the rear-face of said front disc-like portion extending from said stem portion to the periphery of said disc-like portion and terminating a slight distance beyond said periphery, whereby, when said agitator is placed on a fishing line immediately ahead of the bait and hook, with said disc-like portion facing in the relative direction of the travel of the bait and hook with respect to the water, and with the end of said stem portion adjacent said bait and hook, said agitator will impart a pulsating and wobbling action to said bait.

3. A fishing bait agitator adapted to be mounted ahead of and adjacent to a bait and hook on a fishing line, said agitator comprising an integral body having a front disc-like portion and an axially aligned stem portion extending rearwardly from said front portion, said body having an axial channel extending through said body and allowing free passage of the fishing line through said channel and body, radial ribs on the rear face of said front disc-like portion extending from said stem portion to the periphery of said disc-like portion and terminating a slight distance beyond said periphery, and raised rounded lobes on the outer ends of said radial ribs extending rearwardly from said disc-like portion and ribs, whereby, when said agitator is placed on a fishing line immediately ahead of the bait and hook, with said disc-like portion facing in the relative direction of the bait and hook with respect to the water, and with the end of said stem portion adjacent said bait and hook, said agitator will impart a pulsating and wobbling action to said bait.

4. A fishing bait agitator adapted to be mounted ahead of and adjacent to a bait and hook on a fishing line, said agitator comprising an integral body having a front disc-like portion and an axially aligned stem portion extending rearwardly from said front portion, said body having an axial channel extending through the said body and allowing free passage of the fishing line through said channel and body, the diameter of said channel being increased in said stem portion to provide a rearwardly opening recess in the end of said stem portion of said body, a bearing bead loosely mounted on said line ahead of said bait and hook and freely accommodated in said recess, radial ribs on the rear face of said front disc-like portion extending from said stem portion to the periphery of said disc-like portion and terminating a slight distance beyond said periphery, and raised rounded lobes on the outer ends of said radial ribs extending rearwardly from said disc-like portion and ribs, said lobes having a color contrasting with the rest of said body, whereby, when said agitator is placed on a fishing line immediately ahead of the bait and hook, with said disc-like portion facing in the relative direction of travel of the bait and hook with respect to the water, and with the end of said stem portion adjacent said bait and hook, said agitator will impart a pulsating and wobbling action to said bait.

5. A fishing bait agitator adapted to be mounted ahead of and adjacent to a bait and hook on a fishing line, said agitator comprising an integral body having a front disc-like portion with a substantially flat front face and a stem portion extending from said front portion, a plurality of equally-spaced lobes extending radially outwardly beyond the periphery of said front portion, and said body having an axial chamber extending entirely through said body and allowing free passage of a fishing line therethrough, whereby, when said agitator is placed on a fishing line immediately ahead of the bait and hook with said front face facing in the relative direction of travel of said bait and hook with respect to the water, said agitator will impart a pulsating and wobbling action to said bait.

References Cited in the file of this patent

UNITED STATES PATENTS

| | | |
|---|---|---|
| 1,601,267 | Svalgaard | Sept. 28, 1926 |
| 1,782,204 | Jensen | Nov. 18, 1930 |
| 2,594,620 | Braithwaite | Apr. 29, 1952 |
| 2,609,633 | Cracker | Sept. 9, 1952 |
| 2,950,560 | Worden | Aug. 30, 1960 |

FOREIGN PATENTS

| | | |
|---|---|---|
| 497,991 | Belgium | Sept. 30, 1950 |